United States Patent
Biderman et al.

(10) Patent No.: US 9,660,926 B2
(45) Date of Patent: May 23, 2017

(54) MULTI-STREAM SCHEDULING AND REQUESTS

(71) Applicant: Apple Inc., Cupertino, CA (US)

(72) Inventors: David L. Biderman, San Jose, CA (US); Hassan Shojania, Mountain View, CA (US); William B. May, Jr., Sunnyvale, CA (US); John Y. Su, Sunnyvale, CA (US); Roger N. Pantos, Cupertino, CA (US); Jordan B. Schneider, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 202 days.

(21) Appl. No.: 14/291,889

(22) Filed: May 30, 2014

(65) Prior Publication Data

US 2015/0350100 A1    Dec. 3, 2015

(51) Int. Cl.
    *G06F 15/16*      (2006.01)
    *H04L 12/863*      (2013.01)
    (Continued)

(52) U.S. Cl.
    CPC ...... *H04L 47/6215* (2013.01); *H04L 65/4084* (2013.01); *H04L 65/607* (2013.01);
    (Continued)

(58) Field of Classification Search
    CPC ....... H04L 67/02; H04L 69/16; H04L 65/607; H04N 21/643; H04N 21/64322; H04N 21/8456; H04N 21/637
    See application file for complete search history.

(56) References Cited

U.S. PATENT DOCUMENTS 6,904,463 B1 * 6/2005 Fadel ............... H04L 67/2838
                                                             709/219
2010/0040151 A1    2/2010   Garrett
(Continued)

FOREIGN PATENT DOCUMENTS

WO      2011075738 A1     6/2011

OTHER PUBLICATIONS

Belshe et al., "SPDY Protocol draft-ietf-httpbis-http2-00", Internet Engineering Task Force, IETF; Standard Working Draft, Internet Society (ISOC) 4, Nov. 28, 2012, pp. 1-46.
(Continued)

*Primary Examiner* — Jonathan Bui
(74) *Attorney, Agent, or Firm* — Baker Hostetler LLP; Robert L. Hails

(57) ABSTRACT

An embodiment of a method of requesting a plurality of media streams can include, as performed by a computing device, receiving a control input to control a playback function of at least one of the plurality of media streams, determining a download bandwidth between the computing device and a media source on a network, classifying the at least one of the plurality of media streams based on the control input and total download bandwidth, and sending a plurality of requests for the plurality media streams over a single connection to the media source, wherein at least one of an order or a content of the requests is based on the classification. The sending of the media stream requests can utilize at least one of a server-side protocol for multiplexing media streams over a single connection or one or more of HTTP pipelining or HTTP range requests over a single connection.

32 Claims, 5 Drawing Sheets

(51) Int. Cl.
  *H04L 29/06* (2006.01)
  *H04N 21/442* (2011.01)
  *H04N 21/61* (2011.01)
  *H04N 21/637* (2011.01)
  *H04N 21/643* (2011.01)
  *H04N 21/845* (2011.01)
  *H04L 29/08* (2006.01)

(52) U.S. Cl.
  CPC .............. *H04L 65/80* (2013.01); *H04L 67/02* (2013.01); *H04L 69/16* (2013.01); *H04N 21/44209* (2013.01); *H04N 21/6125* (2013.01); *H04N 21/637* (2013.01); *H04N 21/643* (2013.01); *H04N 21/64322* (2013.01); *H04N 21/8456* (2013.01)

(56) References Cited

U.S. PATENT DOCUMENTS

| | | |
|---|---|---|
| 2013/0010049 A1 | 1/2013 | Mostafa et al. |
| 2013/0339537 A1 | 12/2013 | Joy et al. |
| 2014/0052846 A1* | 2/2014 | Scherkus ......... H04N 21/44209 709/224 |
| 2014/0074912 A1 | 3/2014 | Nishimoto et al. |
| 2014/0280760 A1* | 9/2014 | Hurst ..................... H04L 65/60 709/219 |
| 2015/0288617 A1* | 10/2015 | Dasher ................. H04L 47/801 709/226 |
| 2016/0072864 A1* | 3/2016 | Houdaille .......... H04L 43/0894 709/231 |

OTHER PUBLICATIONS

Belshe et al., "Hypertext Transfer Protocol version 2.0 draft-unicorn-httpbis-http2-00", Internet Engineering Task Force, IETF; Standard Working Draft, Internet Society (ISOC) 4, Jul. 2, 2013, pp. 1-52.

Mueller et al., "Dynamic Adaptive Streaming Over HTTP/2.0", 2013 IEEE International Conference on Multimedia and Expo (ICME), IEEE, Jul. 15, 2013, pp. 1-6.

International Search Report and Written Opinion, mailed Jul. 22, 2015, from corresponding International Application No. PCT/US2015/028047, filed Apr. 28, 2015.

International Patent Application No. PCT/US2015/028047; Int'l Preliminary Report on Patentability; dated Dec. 15, 2016; 7 pages.

\* cited by examiner

MULTI-STREAM SCHEDULING AND REQUESTS

BACKGROUND INFORMATION

Streaming digital media from a remote source to a local client over a network is an increasingly popular way of obtaining and viewing media such as video using computers, tablets and smartphones. In some contexts, it is even desirable to simultaneously view multiple media streams in a specified or controlled manner. Unfortunately, the requesting of multiple media streams to accommodate a specified or controlled manner of simultaneous display has to date presented difficulties that have hampered implementations of such functionality.

One popular way of delivering data over the Internet includes establishing a Transmission Control Protocol (TCP) connection between a data source and a client, and using the TCP connection to transmit requests from the client to the server and requested data from the server to the client. But when multiple TCP connections exist between the client and server in a constrained network environment, the TCP connections tend to compete with each other for available bandwidth and other network resources, and through this competition move toward a state of bandwidth equality with respect to each other. Thus, merely assigning multiple simultaneous media streams to multiple different TCP connections between the client and server, or to other multiple connections that behave in a similar manner, tends to promote bandwidth equality among the streams. However, bandwidth equality among multiple simultaneously streams conflicts with the desire in some contexts to simultaneously display the media streams in a specified or controlled manner other than involving equality of the size, resolution or quality of the displays.

Therefore, a need exists for an improved way of requesting and receiving multiple media streams so as to enable the simultaneous display of the streams in a specified or controlled manner other than with equality of the size, resolution or quality of the displays.

BRIEF DESCRIPTION OF THE DRAWINGS

So that features of the present invention can be understood, a number of drawings are described below. However, the appended drawings illustrate only particular embodiments of the invention and are therefore not to be considered limiting of its scope, for the invention may encompass other equally effective embodiments.

DETAILED DESCRIPTION OF EXAMPLE EMBODIMENTS

An embodiment of a method of requesting a plurality of media streams can include, as performed by a computing device, receiving a control input to control a playback function of at least one of the plurality of media streams, determining a download bandwidth between the computing device and a media source on a network, classifying the at least one of the plurality of media streams based on the control input and total download bandwidth, and sending a plurality of requests for the plurality media streams over a single connection to the media source, wherein at least one of an order or a content of the requests is based on the classification.

The method thereby provides an improved requesting of a plurality of media streams to enable the simultaneous display of the media streams in a specified or controlled manner that reduces or eliminates the dependence of the display manner of on the tendency of multiple connections to compete with each other for available bandwidth and move toward a state of bandwidth equality with respect to each other.

Embodiments of the method can classify the plurality of media streams by assigning a priority to each of media streams, and then send the plurality of media stream requests in an order based on the assigned priorities. The method can also receive over the single connection and simultaneously display the plurality of media streams, where the simultaneous display can include displaying at least one of the media streams at a larger display size than others of the media streams. The sending of the media stream requests can utilize at least one of a server-side protocol for multiplexing media streams over the single connection or one or more of HTTP pipelining or HTTP range requests over the single connection. The single connection between the computing device and the media source can be a single Transmission Control Protocol (TCP) connection between the computing device and media source.

Non-transitory machine-readable media can include program instructions that when executed perform embodiments of this method. A computing device can include a display, a processor, a user interface and a storage component, the storage component including program instructions that when executed by the processor perform embodiments of this method.

Figure 1:
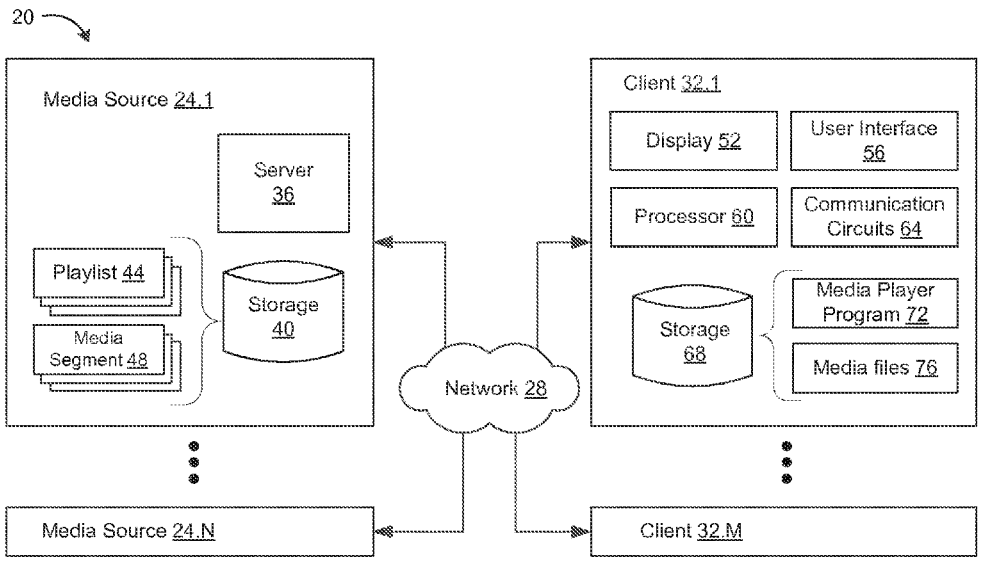
FIG. 1 is a schematic diagram depicting an embodiment of a media streaming system.

FIG. 1 depicts an embodiment of a media streaming system 20 for use in streaming media. The depicted media streaming system 20 can include one or more media sources 24 (e.g., media sources 24.1 . . . 24.N), a communication network 28, and one or more client devices 32 (e.g., client devices 32.1 . . . 32.M).

Each media source 24 can provide a platform to serve media streams to the client devices 32 over the network 28. The media sources 24 can each include a storage component 40 to store a variety of media files and a server component 36 to serve streams to the client devices 32. The storage component 40 can include one or more of a storage device, computing device, database, etc., configured to store and provide to the sever component media files such as playlist files 44 and media segment files 48. The server component 36 can be a computing device such as a general purpose or specialized computer, and include a processor, communication circuits and computer programs configured to serve media streams based on the media files over the network 28 to the client devices 32. The server component 36 can optionally be a web server.

The communication network 28 can enable communication of data between the media sources 24 and client devices 32, and can include components of one or more of the Internet, communication networks local to the media sources 24, or communication networks local to the client devices 32.

The client devices 32 can each provide a platform for a user to select, receive and display media streams. Each client device 32 can be a computing device such as a desktop computer, laptop computer, tablet computer, or smartphone. Each can include a display 52, a user interface 56, a processor 60, communication circuits 64, and a storage component 68, the storage component 68 storing a media player program 72 and media files 76.

The media streamed by the media streaming system 20 can include a variety of different types of media and/or multimedia, including one or more of video, audio, or presentations, etc. To provide media streams from the media sources 24 to the client devices 32, the media streaming system 20 can utilize media files embodying the media to be streamed, such as, for example, the playlist and media segment files 44, 48.

Figure 2:
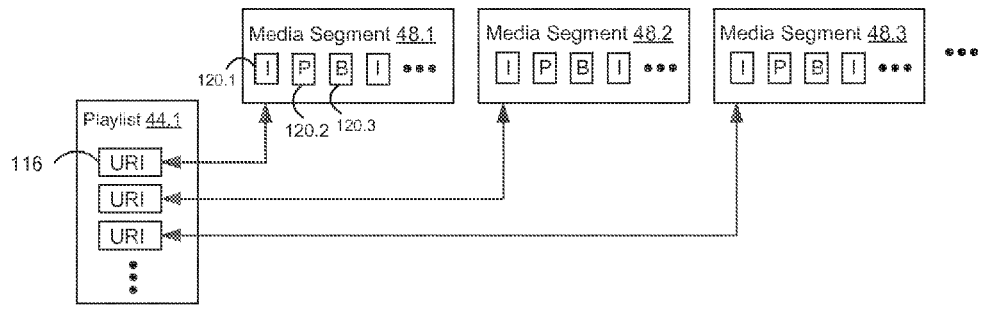
FIG. 2 is a schematic diagram depicting embodiments of playlist and media segment files.

FIG. 2 depicts an embodiment of the playlist and media segment files 44, 48 for use in producing a media stream including a video component. Each such media stream can be associated with one or more playlist files 44.1 and one or more media segment files 48.1, 48.2, 48.3 . . . . Each of the playlist files 44.1 corresponding to the stream can include an ordered list of pointers 116, such as uniform resource indicators (URIs), that point to the media segment files 48.1, 48.2, 48.3 . . . or portions thereof. The media segment files 48.1, 48.2, 48.3 . . . pointed to by the playlist file 44.1 can include media segments defining the video of the stream, and can each include data for one or more video frames 120.1, 120.2, 120.3 . . . of the video component of the stream, such as one or more of I-frames 120.1, P-frames 120.2 or B-frames 120.3.

Generally speaking, to provide a media stream from one of the media sources 24 to one of the client devices 32 using playlist and media segment files 44, 48, one or more playlist files 44 corresponding to the stream can first be transmitted from the media source 24 to the client device 32. The client device 32 can then request the media segment files 48 or portions thereof corresponding to the media stream from the media source 24 using the ordered list of pointers 116 contained in the playlist file 44 to reference locations of the media segment files 48 or portions thereof. Finally, the media source 24 can serve the requested media segment files 48 or portions thereof to the client device 32 as the media stream.

Figure 3:
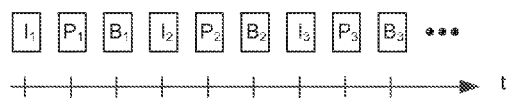
FIG. 3 depicts an embodiment of a video frame display timeline during a playback of a media stream.

FIG. 3 depicts an embodiment of a timeline of display of video frames by the media player program 72 during a normal speed forward playback of a video component of a media stream that can be produced utilizing playlist and media segment files 44, 48 of the type depicted in FIG. 4A. In the depicted timeline, the normal speed playback includes displaying each frame $I_1, P_1, B_1, I_2, P_2, B_2, I_3, P_3, B_3, \ldots$ of the video in order and at a predetermined rate of display, where frames $I_1, I_2, I_3 \ldots$ are I-frames, frames $P_1, P_2, P_3 \ldots$ are P-frames and frames $B_1, B_2, B_3 \ldots$ are B-frames. Fast forward or rewind playback modes can include displaying only certain selected frames, such as for example only each I-frame or a selected subset of the I-frames, of the video in a forward or reverse order at a predetermined rate of display.

Figure 4:
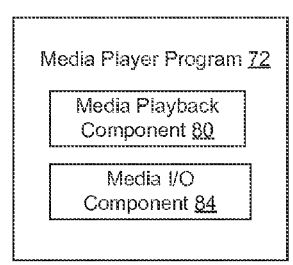
FIG. 4 is a schematic diagram depicting an embodiment of a media player program of a client device of the media streaming system.

The media player program 72 can include program instructions that are executable by the processor 60 of the client device 32 to provide a media player user interface and media stream functions at the client device 32. FIG. 4 depicts an embodiment of the media player program 72. The media player program 72 can include a media playback component 80, configured to provide the media player user interface and associated functionality to enable the user to select media streams and perform playback functions for the media streams as discussed herein, and a media input/output (I/O) component 84, configured to perform media stream requests and receipt of media stream data as discussed herein.

Figure 5A:
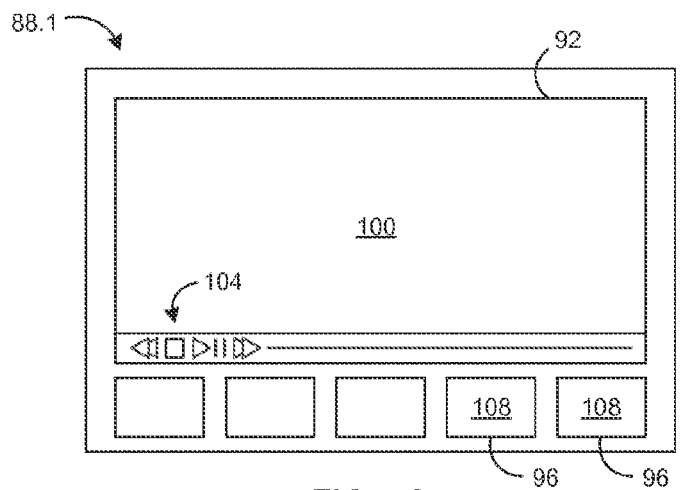
FIGS. 5A-5C depict embodiments of a portion of a user interface provided by the media player program to display and control playback of media streams.
Figure 5B:
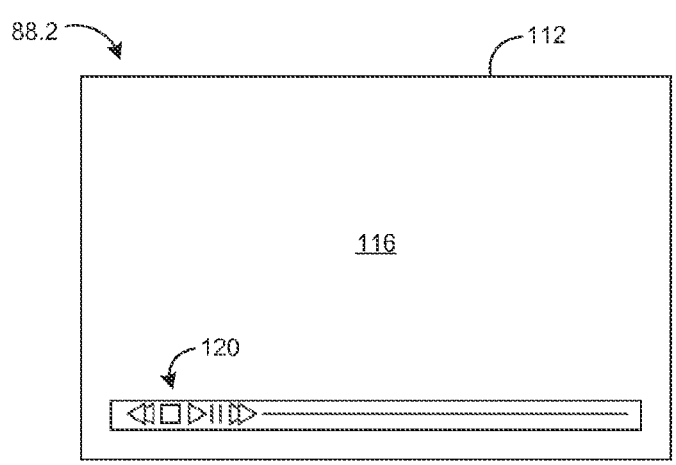
Figure 5C:
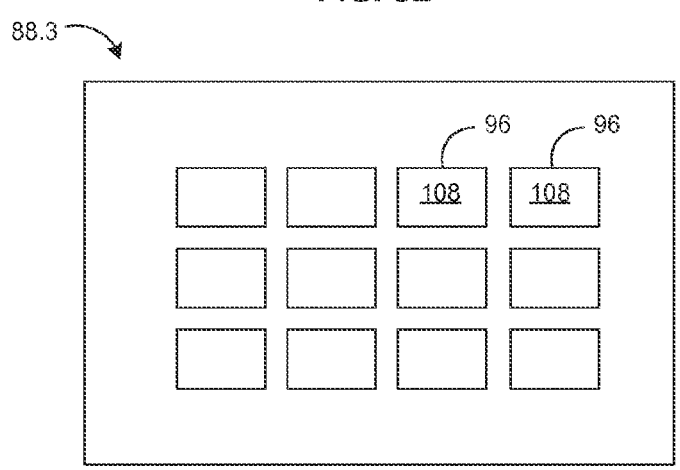

The media player interface of the media player program 72 can provide a configurable interface to selection, playback and other control functions for one or more media streams. FIG. 5A-5C depict embodiments of portions of the media player interface 88 (e.g., 88.1, 88.2, 88.3 . . . ) of the media player program 72 provided to perform media stream functions.

FIG. 5A depicts a first embodiment of a configuration of the media player interface 88.1. The first configuration of the media player interface 88.1 can include a plurality of video displays, each to display a video or other visual component of a corresponding media stream. The plurality of video displays can include a primary video display 92 and a plurality of secondary video displays 96, the primary video display 92 occupying a larger area of the media player interface 88.1 as measured by a total pixel size than each of the plurality of secondary video displays 96. The primary video display 92 can include a display portion 100 to display the video or other visual component of a corresponding media stream, and playback controls 104 to receive playback commands from a user such as play, stop, pause, rewind and fast forward. Each of the secondary video displays 96 can include only a corresponding display portion 108 to display a video or other visual component of a corresponding media stream. Each of the video displays can display a video or other visual component of a different media stream.

FIG. 5B depicts a second embodiment of a configuration of the media player interface 88.2. The second configuration of the media player interface 88.2 can include a single maximized video display 112 to display a video or other visual component of a corresponding media stream. The maximized video display 112 can occupy substantially an entire area of the media player interface 88.2 or the display 52 of the client device 32, a larger area as measured by a total pixel size than that of the primary or secondary video displays 92, 96. The maximized video display 112 can include a display portion 116 to display the video or other visual component of the corresponding media stream and playback controls 120 to receive playback commands from the user.

FIG. 5C depicts a third embodiment of a configuration of the media player interface 88.3. The third configuration of the media player interface 88.3 can include a plurality of the secondary video displays 96 as discussed above.

The embodiments of the media player interface 88 of FIGS. 5A-5C can thus be utilized by a user to enable a variety of different viewing scenarios, such as mainly viewing a media stream holding the most interest in a primary video display 92 but monitoring a plurality of other media streams in secondary video displays 96, viewing a media stream holding the most interest at any given time in a maximized video display 112, and viewing a plurality of different media streams at the same time in a plurality of secondary video displays 96 either as an end in itself or to choose a particular media stream to display in a primary or maximized video display 92, 112.

The media player interface 88 can also be configured to enable the user to switch between interface configurations to thereby select, control or change a display size, resolution or quality of media streams displayed by the media player program 72. To this end, the video displays can be configured to accept a control input to expand and/or reduce the display of the media stream displayed therein at the time of the input. For example, the primary video display 92 can be configured to accept an input to expand the display of the contained media stream into a maximized video display 112 or reduce the display to a secondary video display 96. The secondary video display 96 can be configured to accept an input to expand the display of the contained media stream into either a primary or maximized video display 92, 112. The maximized video display 112 can be configured to accept an input to reduce the display of the contained media stream into either a primary or secondary video display 92, 96.

Other configurations of the media player interface are also possible, such as that provide different layouts, combinations or arrangements of one or more video displays to display videos or other visual components of media streams or functionalities thereof.

The media streaming system 20 can provide an improved method of, and corresponding systems and apparatuses for, requesting a plurality of media streams to enable the simultaneous display of the media streams in a specified or controlled manner that reduces or eliminates the dependence of the manner of display on the tendency of multiple connections to compete with each other for available bandwidth and move toward a state of bandwidth equality with respect to each other.

Figure 6:
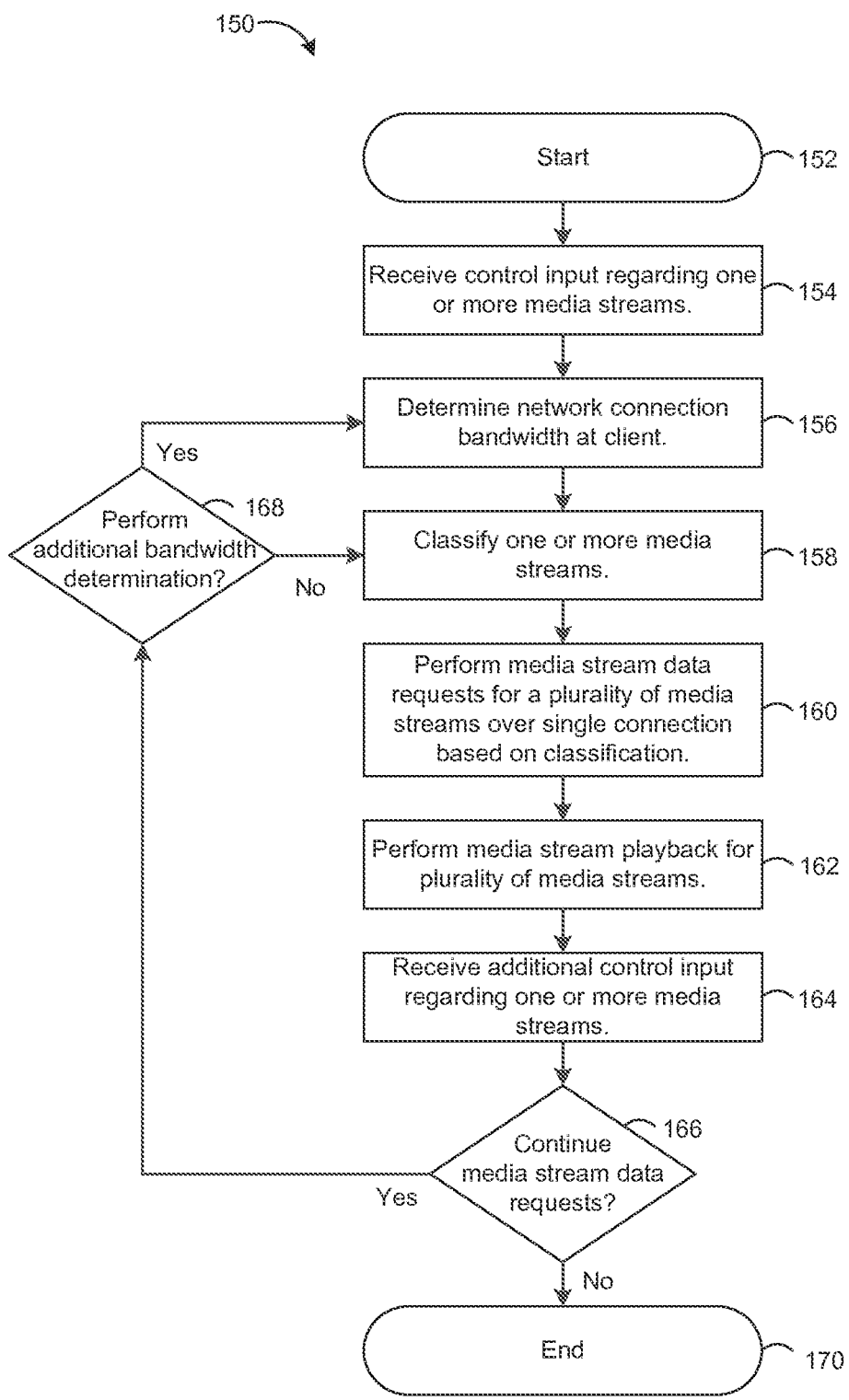
FIG. 6 is a flowchart depicting an embodiment of a method of requesting a plurality of media streams.

FIG. 6 depicts an embodiment of the method 150 of requesting a plurality of media streams. The steps of the method 150 of FIG. 6 can each be performed by one or more components of the media streaming system 20, such as by one or more components of the client device 32, including by one or more components of the media player program 72 as executed by the processor 60 of the client device 32 and in conjunction with operation of the display 52, user interface 56, communication circuits 64 and storage component 68 of the client device 32. The method can begin at step 152.

A control input related to one or more media streams can be received by the media player program 72 at step 154. The control input can include one or more of a selection of, a change in the display size of, or a playback control input for the one or more media streams. The control input can be received from the user at the media player interface 88, such as at one of the video displays of the media player interface. Alternatively, the control input can be received by the media player program 72 as an automatically or responsively generated control input by one or more components of the client device 32, including various components of the media player program 72 itself.

In one example, the control input can be a control input received to initiate or set up a media stream viewing session, such as to identify or select one or more media streams or assign one or more media streams to corresponding video displays of the media player interface 88. In another example, the control input can be a control input received to change a display size of a media stream during a viewing session, such as to transition a media stream from a primary video display 92 to a maximized or secondary video display 112, 96, from a secondary video display 96 to a primary or maximized video display 92, 112, or from a maximized video display 112 to a primary or secondary video display 92, 96, etc.

A bandwidth between the client device 32 and the network 28 can be determined at step 156. The bandwidth determined at step 156 can be a total download bandwidth between the client device 32 and a media source 24 from which the client device 32 is requesting or will request the plurality of media streams. The total download bandwidth can be the full download bandwidth capacity between the client device 32 and media source 24 without the presence of other connections between the client device 32 and the media source 24 or other entities connected to the network 28, and thus can represent an absolute measure of the download bandwidth capacity between the client device 32 and media source 24 at the time at which it is determined.

The total download bandwidth can be determined in various different ways. In one technique, one or more connections between the client device 32 and the media source 24 can be established, with substantially no other connections between the client device 32 and other entities connected to the network 28 being present, and data transmissions between the client device 32 and the media source 24 can be conducted over the one or more connections so as to determine the total download bandwidth.

In another technique, one or more connections between the client device 32 and the media source 24 can be established, with or without other connections between the client device 32 and other entities connected to the network 28 being present, and data transmissions between the client device 32 and the media source 24 can be conducted over the one or more connections therebetween, with the total download bandwidth being determined as a function of both the data transmissions between the client device 32 and the media source 24 and an estimated correction factor based any other data transmissions occurring between the client device 32 and other entities connected to the network 28 at the time of the determination.

In yet another technique, the total download bandwidth can be estimated as a function of data transmissions between the client device 32 and the media source 24 or other entities connected to the network 28.

Alternatively, another type of bandwidth between the client device 32 and the media source 24 or other entities connected to the network 28 can be determined at step 156, such as a predetermined percentage of the total download bandwidth between the client device 32 and media source 24 or between the client device 32 and another entity connected to the network 28.

One or more media streams to be or currently being displayed by the media player program 72 can be classified at step 158. The media streams classified can include each media stream to be or currently being displayed by the media player program 72. The classification can be performed so as to allocate the available download bandwidth between the client device 32 and the media source 24 during requesting of the plurality of media streams by the client device 32 from the media source 24. The classification can be based on one or more of the control input received at step 154 and the bandwidth determined at step 156. The classification can also take a variety of forms, such as assigning a priority to each classified stream, or assigning each stream to a corresponding one of a plurality of tier levels, etc.

In one example, the one or more media streams can be classified based on the stream's display size within the media player interface 88 as a result of the control input. For instance, for a control input leading to a configuration featuring a single primary video display 92 and a plurality of secondary video displays 96, the media stream displayed in the primary video display 92 can be assigned a relatively higher priority or to a higher tier level and the media streams displayed in the secondary video displays 96 can be assigned a relatively lower priority or to a lower tier level.

In another example, each stream can be classified based on the stream's playback status within the media player interface 88 as a result of the control input. For instance, for a control input leading to playback of one or more media streams being paused or stopped, the media streams still undergoing active playback can be assigned a relatively higher priority or to a higher tier level than those media streams that are stopped or paused.

In yet another example, each stream can be classified based on a relative value of the determined bandwidth. For instance, for a relatively lower determined bandwidth value, streams displayed in a primary video display 92 can be assigned a relatively higher priority higher priority or to a higher tier level relative to an assignment for such streams for a relatively higher determined bandwidth value. Similarly, for a relatively higher determined bandwidth value, streams displayed in a secondary video display 96 can be assigned a relatively higher priority or to a higher tier level relative to an assignment for such streams for a relatively lower determined bandwidth value.

In a further example, each stream can also be classified based on a combination of any of the above factors.

Requests for media stream data for a plurality of media streams to be displayed or currently being displayed by the media player program 72 can be performed over a single connection between the client device 32 and media source 24 based on the classification of the one or more streams at step 160. The requests can be performed over the single connection based on the classification to effectively allocate the available download bandwidth between the client device 32 and the media source 24 to achieve simultaneous display of the plurality of media streams in a manner specified or controlled by the control input, and thereby reduce or eliminate the dependence of the display manner on the tendency of multiple connections to compete with each other and move toward bandwidth equality, as well as improve error recovery for the single connection by maintaining a relatively higher level of continued data transmission over the single connection.

Figure 7:
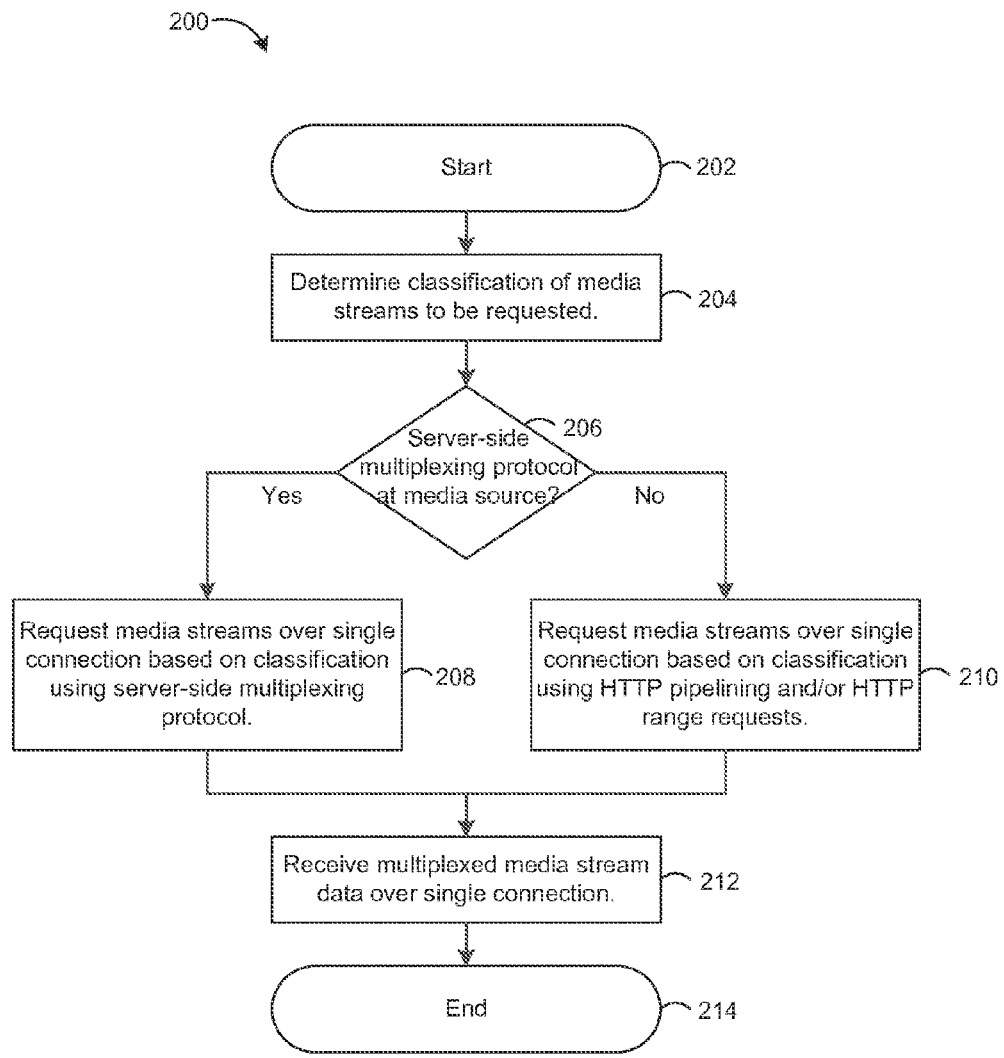
FIG. 7 is a flowchart depicting an embodiment of a method of performing media stream data requests for the plurality of media streams over a single connection between the client device and a media source of the media streaming system.

The requesting of media stream data over a single connection based on the classification of the one or more streams can be performed in various different ways. FIG. 7 depicts an embodiment of a method 200 of performing the requesting of media stream data. The steps of the method 200 of FIG. 7 can each be performed by one or more components of the media streaming system 20, such as by one more components of the client device 32, including by one or more components of the media player program 72 as executed by the processor 60 of the client device 32 and in conjunction with operation of the display 52, user interface 56, communication circuits 64 and storage component 68 of the client device 32. The method can begin at step 202.

The classification of the plurality of media streams can be determined at step 204. The determining of the classification of the plurality of media streams can determine a classification of each of the plurality of media streams for which requests for media stream data are to be performed. The determining of the classification of the plurality of media streams can include determining the classification of the one or more media streams at step 158 of method 150.

In one example, the media player program 72 can keep a running log of the classifications of the media streams assigned to video displays of the media player interface 88, including as classified at step 158 of method 150 in response to the control input, and the determining of the classification of the plurality of media streams at step 204 of method 200 can be performed by the media player program 72 consulting such a log.

Whether a server-side protocol for multiplexing multiple media streams over a single connection exists at the media source 24 can be determined at step 206. Whether such a server-side protocol exists at the media source 24 can be determined in a various different ways, such as by one or more of polling the media source 24, or consulting a list of services provided by the media source 24, etc.

One server-side protocol for multiplexing multiple media streams over a single connection is the Speedy (SPDY) protocol. The SPDY protocol can be implemented in a stack of protocol layers. The stack of protocol layers can include a Hypertext Transport Protocol (HTTP) layer, a SPDY protocol layer, a Secure Sockets Layer (SSL) protocol, and a TCP connection. The stack of protocol layers can be structured to have the HTTP layer operate on top the SPDY layer, the SPDY layer operate on top of the SSL layer, and the SSL layer operate on top of the TCP connection. Another server-side protocol for multiplexing multiple media streams over a single connection is the Minion protocol, which can be implemented using a modified TCP connection.

If it is determined that a server-side protocol for multiplexing multiple media streams over a single connection between the client device 32 and media source 24 exists, requests for media stream data for the plurality of media streams can be performed using such a protocol at step 208. The requests for media stream data for the plurality of media streams can be performed using a server-side protocol for multiplexing multiple media streams over a single connection by formulating and sending by the client device 32 a corresponding single request for each media stream identifying the respective media stream and a respective priority level for that media stream. The respective priority level can be based on the classification of the respective media stream.

In one example, if it is determined that the media source implements the SPDY protocol, the requests for media stream data for the plurality of media streams can be performed by formulating and sending by the client device 32 to the media source 24 for each media stream a single request identifying the respective media stream and a respective priority level for that media stream in accordance with the SPDY protocol. Such a request can include a SYN_STREAM control frame identifying the media stream and the priority.

Figure 8A:
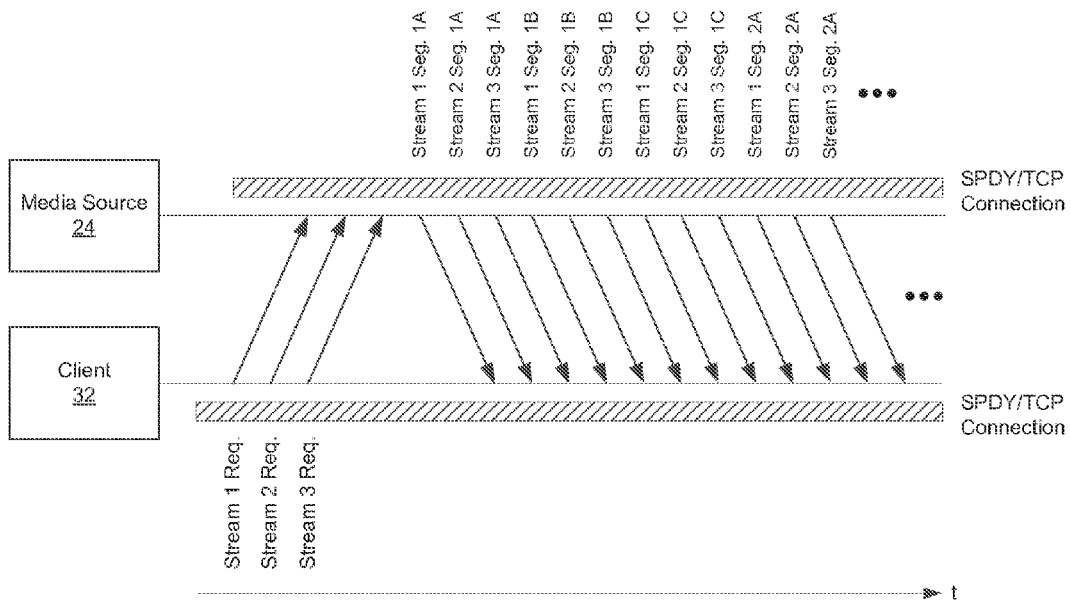
FIGS. 8A-8B are depict embodiments of data transmission timelines over single connections between the client device and media source.

FIG. 8A depicts an embodiment of a timeline of selected media stream data transmissions between the client device 32 and the media source 24 during an exemplary performance of embodiments of the methods 150, 200. In FIG. 8A, the media stream data for the plurality of media streams can be requested using a single SPDY/TCP connection (such as involving an HTTP, SPDY, SSL and TCP protocol stack). Requests for a first media stream, a second media stream and a third media stream are sent sequentially from the client device 32 to the media source 24. Media stream data for the plurality of media streams responsive to the requests can then be sent from the media source to the client device 32 multiplexed over the single SPDY/TCP connection.

If it is determined that a server-side protocol for multiplexing multiple media streams over a single connection between the client device 32 and media source 24 does not exist, requests for media stream data for the plurality of media streams can be performed over a single connection between the client device 32 and media source 24 based on the classification of the streams using one or more of HTTP pipelining or HTTP range requests to accomplish media stream multiplexing over the single connection at step 210.

The requests for media stream data for the plurality of media streams over the single connection based on the classification can be performed using HTTP pipelining. With HTTP pipelining, a plurality of HTTP requests can be sent from the client device 32 to the media source 24 over the single connection without waiting for responses to any of the requests to arrive back at the client device 32 from the media source 24. The media source 24 can then respond to the requests in the order in which they were received by sending a corresponding data transmissions having the requested data to the client device 32 even as further requests are being received from the client device 32. HTTP pipelining can thus be used to multiplex the requesting and receiving of media stream data for the plurality of media streams over a single connection by formulating and sending an ordered series of HTTP requests from the client device 32 to the media source 24 for media stream data, where at least one of the order or the content of the HTTP requests is based on the classification, so as to provide for receiving the media stream data in a way that enables the simultaneous display of the media streams in a specified or controlled manner (such as resulting from the received control input). That is, the order or content of the pipelined HTTP requests can be selected so as to result in media stream data for the plurality of media streams arriving at the client device 32 in an order and amount for each of the media streams that enables the simultaneous display of the media streams in the specified or controlled manner. Such HTTP requests can be formulated using HTTP commands including the HTTP GET command.

The requests for media stream data for the plurality of media streams over the single connection based on the classification can also be performed using HTTP range requests. With HTTP range requests, an HTTP request can be sent from the client device 32 to the media source 24 over the single connection that indicates that only a certain byte range of the data resource indicated by the request is to be returned. The media source 24 can then respond to the request by sending a data transmission having the corresponding requested data range of the indicated data resource to the client device 32. HTTP range requests can thus be used to multiplex the requesting and receiving of media stream data for the plurality of media streams over a single connection by formulating and sending an ordered series of HTTP range requests from the client device 32 to the media source 24 for media stream data, where at least one of the order or the content of the HTTP range requests is based on the classification, so as to provide for receiving the media stream data in a way that enables the simultaneous display of the media streams in a specified or controlled manner (such as resulting from the received control input). That is, the order or content of the HTTP range requests can be selected so as to result in media stream data for the plurality of media streams arriving at the client device 32 in an order and amount for each of the media streams that enables the simultaneous display of the media streams in the specified or controlled manner. Such HTTP range requests can be formulated using HTTP commands including the HTTP GET command with a Range header field.

The single connection, over which requests for media stream data using one or more of HTTP pipelining or HTTP range requests can be performed, can be a single connection of various different connection types. In one embodiment, the single connection can be a single TCP connection. In other embodiments, the single connection can be a single User Datagram Protocol (UDP) connection, a single Stream Control Transmission Protocol (SCTP) connection, or another type of single connection.

Figure 8B:
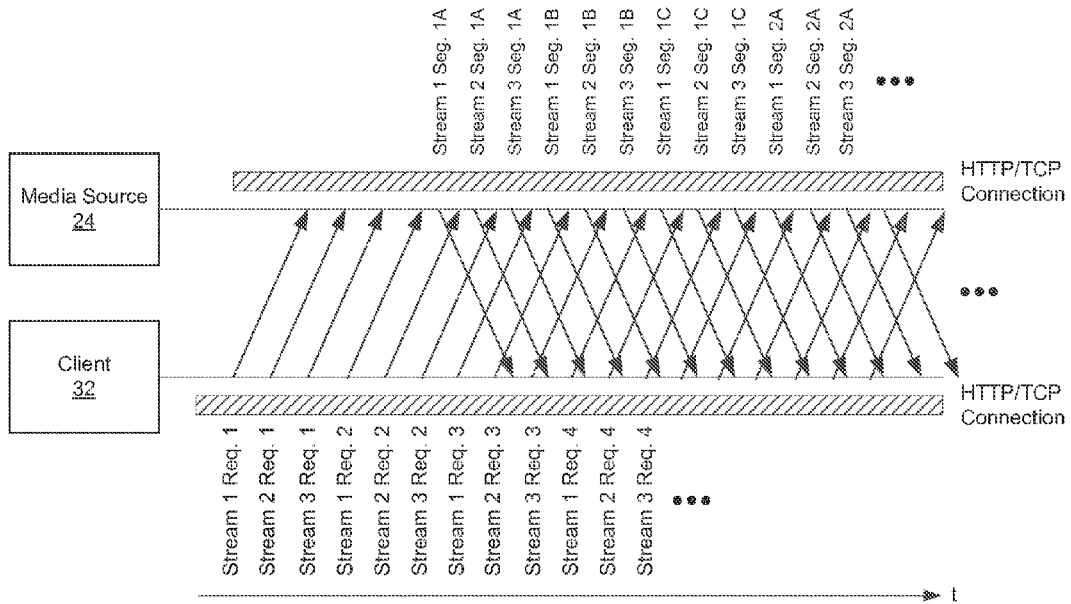

FIG. 8B depicts an embodiment of a timeline of selected media stream data transmissions between the client device 32 and the media source 24 during an exemplary performance of embodiments of the methods 150, 200. In FIG. 8B, the media stream data for the plurality of media streams can be requested over a single HTTP/TCP connection (such as involving an HTTP over TCP protocol stack) using HTTP pipelining and HTTP range requests.

As depicted, requests for exemplary first, second and third media streams can be pipelined by sending requests for the first, second a third media streams sequentially and repeatedly from the client device 32 to the media source 24. That is, a first request is sent for the first media stream, a first request is sent for the second media stream, and a first request is sent for the third media stream, and then this sequence is repeated, with second requests being sent for each of the media streams, then third requests, and so on. The order of the requests can be based on the classification of the first, second and third streams so as to result in receiving the media stream data in an order and amount for each of the streams to enable the simultaneous display of the streams in a specified or controlled manner. For example, the depicted exemplary order of the pipelined requests can be based on the first media stream being classified as a higher priority or to a higher tier level than the second and third media streams, to thereby result in at least some media stream data for the first media stream being received before media stream data for the second and third media streams.

As also depicted, range requests for the first, second and third media streams can be sent by assigning ranges of indicated data resources to each of the requests for the first, second, and third media streams. That is, responses to the first requests for the first, second and third media streams return first ranges 1A representing only first requested portions of an indicated media resources 1 for the streams; responses to the second requests for the first, second and third media streams return second ranges 1B representing only second requested portions of the indicated media resource 1 for the streams; responses to the third requests for the first, second and third media streams return third ranges 1C representing only third requested portions of the indicated media resource 1 for the streams, and so on. The apportioning of ranges to the requests can be based on the classification of the first, second and third streams so as to result in receiving the media stream data in an order and amount for each of the streams to enable the simultaneous display of the streams in a specified or controlled manner. For example, the exemplary apportioning can result in a larger range being requested for initial and/or other requests for media streams classified as a higher priority or to a higher tier level than for media streams classified as a lower priority or to a lower tier level. The exemplary apportioning can also result in ranges being requested for initial and/or other requests for media streams classified at a same priority or tier level with respect to each other that substantially evenly balances an amount of download bandwidth between such same priority streams.

Media stream data requests can be formulated utilizing the playlist and media segment files 44, 48 discussed above. In one example, three media streams can include a media stream A, a media stream B, and a media stream C, the media stream A being classified as a higher priority based on being displayed in a primary video display and the media streams B and C being classified as a lower priority based on being displayed in secondary video displays. An exemplary request sequence for the three media streams utilizing HTTP pipelining and HTTP range requests can include first requesting in sequence a first third of a first data segment of media stream A, a first third of first data segment of media stream B, a first third of a first data segment of media stream C, then request in sequence a second third of the first data segment of media stream A, a second third of the first data segment of media stream B, a second third of first data segment of media stream C, and so on, eventually proceeding to the second data segments of the media streams, etc. In this way, HTTP pipelining can be used to interleave the requests and media stream data for the media streams on the single connection, and HTTP range requests can be used to structure this interleaving to occur in smaller increments of media stream data than can be achieved by only requesting whole media segments.

Note that for simplicity of illustration, FIGS. 8A-B may omit various data transmissions between the client device 32 and media source 24 other than the selected media stream data requests and corresponding responses, such as transmissions to establish the corresponding connections, etc.

The requests for media stream data for the plurality of media streams over the single TCP connection based on the classification can also be performed using the Explicit Congestion Notification Extension (ECN) to TCP. Utilizing ECN can reduce the incidence of TCP connection stalls to thereby minimize operational latency. The requests for media stream data for the plurality of media streams can be performed using ECN by including an ECN flag in one or more packets of one or more of the requests or data transmissions responsive to the requests.

In embodiments, the performing of the method 200 can optionally skip the determination of whether a server side protocol exists at step 206, and proceed directly to performing media stream data requests over a single connection utilizing a server-side protocol for multiplexing at step 208 or performing media stream data requests over a single connection utilizing one or more of HTTP pipelining or HTTP range requests at step 210.

Multiplexed media stream data for the plurality of media streams can be received on the single connection in response to the requests for media stream data for the plurality of media streams at step 212. The method 200 can end at step 214.

Returning to FIG. 6, media stream playback functions for the plurality of media streams to be displayed or currently being displayed by the media player program 72 can be performed based on the received control input and using the received media stream data at step 162.

An additional control input related to one or more media streams can be received by the media player program 72 at step 164. Step 164 can be performed in the same manner as step 154, and thus, as discussed above, the control input can include any of a selection of, a change in the display size or status of, or a playback control input for the one or more media streams, and can be received from the user at one of the video displays of the media player interface 88 of the media player program 72 or as an automatically or responsively generated control input.

The received additional control input can be evaluated to determine if a media stream requests are to continue at step 166. The media stream requests can continue in response to a control input that results in at least one video display of the media player interface 88 continuing to display a media streams in an unstopped playback state, such as a normal speed forward, fast forward, rewind, or pause playback state. The media stream requests can end in response to a control input that results in closure of all video displays of the media player interface 88 or stoppage of playback of media streams in all remaining video displays.

If the received additional control input indicates that media stream requests are to not continue, the method can end at step 170.

If the received additional control input indicates that media stream requests are to continue, it can be determined whether to perform an additional bandwidth determination at step 168. Whether to perform an additional bandwidth determination can be determined based one or more factors including: the length of time since a most previous bandwidth determination has been performed, the additional control input indicating a change in a number of media streams to be displayed, or the additional control input indicating a change in a display size of at least one of the media streams being displayed.

If it is determined that an additional bandwidth determination is to be performed, the method can proceed back to step 156. If it is determined that an additional bandwidth determination is not to be performed, the method can proceed back to step 158.

Additional embodiments of the media streaming system 20 and associated methods 150, 200 are possible. For example, any feature of any of the embodiments of the media streaming system 20 and associated methods 150, 200 described herein can optionally be used in any other embodiment of the media streaming system 20 and associated methods 150, 200. Also, embodiments of the media streaming system 20 and associated methods 150, 200 can optionally include any subset or ordering of the components or features of the media streaming system 20 and associated methods 150, 200 described herein.

What is claimed is:

1. A streaming management method, comprising:
   sending, by a computer device, a first plurality of requests for a plurality of concurrently-active media streams;
   receiving, at the computing device, a control input to control a playback function of at least one of the plurality of concurrently-active media streams;
   determining, by the computing device, a download bandwidth between the computing device and a media source on a network;
   classifying, by the computing device, the plurality of concurrently-active media streams based on the control input and total download bandwidth; and
   sending, by the computing device, a second plurality of requests for the plurality of concurrently-active media streams over a single connection to the media source, the second plurality of requests representing an alteration of the first plurality of requests according to the classification.

2. The method of claim 1, wherein the classifying assigns a priority to each of the plurality of concurrently-active media streams and the sending the second plurality of requests comprises sending the second plurality of requests in an order based on the assigned priorities.

3. The method of claim 1, further comprising receiving over the single connection and simultaneously displaying, by the computing device, the plurality of concurrently-active media streams.

4. The method of claim 3, wherein the simultaneously displaying includes displaying a first of the plurality of concurrently-active media streams at a first display size and at least one second of the plurality of concurrently-active media streams at a second display size, the first display size having larger pixel size than the second display size.

5. The method of claim 4, wherein the classifying assigns a relatively higher priority to the first media stream and a relatively lower priority to the at least one second media stream, and the sending the second plurality of requests comprises sending at least one request for the first media stream before sending requests for the at least one second media stream.

6. The method of claim 1, wherein the single connection is a single Transmission Control Protocol (TCP) connection between the computing device and the media source.

7. The method of claim 1, wherein the sending the second plurality of requests comprises sending a plurality of pipelined HTTP requests for the plurality of concurrently-active media streams over a single Transmission Control Protocol (TCP) connection in an order based on the classification.

8. The method of claim 1, wherein the sending the second plurality of requests comprises interleaving HTTP requests for different ones of the plurality of concurrently-active media streams over a single Transmission Control Protocol (TCP) connection in an order based on the classification.

9. The method of claim 1, wherein at least one of the sending the first plurality of requests and the sending the second plurality of requests comprises sending a plurality of HTTP range requests for ranges of media stream data files associated with the plurality of media streams over a single Transmission Control Protocol (TCP) connection.

10. The method of claim 1, further comprising determining, by the computing device, whether a server-side protocol for multiplexing media streams over a single connection exists at the media source.

11. The method of claim 1, wherein at least one of the sending the first plurality of requests and the sending the second plurality of requests utilizes a server-side protocol for multiplexing media streams over a single connection.

12. The method of claim 11, wherein the server-side protocol includes at least one of a Speedy (SPDY) protocol and a Minion protocol.

13. The method of claim 11, wherein the server-side protocol is SPDY and the sending the second plurality of requests includes sending a corresponding request for each of the plurality of media streams including an SPDY stream creation control frame indicating an assigned priority for the respective media stream based on the classification.

14. The method of claim 1, wherein the computing device includes at least one of: a desktop computer, a laptop computer, a tablet computer, and a smartphone.

15. A non-transitory machine-readable medium having program instructions, which when executed by a processor perform a method, comprising:
   sending, by a computing device, a first plurality of requests for a plurality of concurrently-active media streams;
   receiving, at the computing device, a control input to control a playback function of at least one of the plurality of concurrently-active media streams;
   determining, by the computing device, a download bandwidth between the computing device and a media source on a network;
   classifying, by the computing device, the plurality of concurrently-active media streams based on the control input and total download bandwidth; and
   sending, by the computing device, a second plurality of requests for the plurality of concurrently-active media streams over a single connection to the media source, the second plurality of requests representing an alteration of the first plurality of requests according to the classification.

16. The non-transitory machine-readable medium of claim 15, wherein the classifying assigns a priority to each of the plurality of concurrently-active media streams and the sending the second plurality of requests comprises sending the second plurality of requests in an order based on the assigned priorities.

17. The non-transitory machine-readable medium of claim 15, the method further comprising receiving over the single connection and simultaneously displaying, by the computing device, the plurality of concurrently-active media streams.

18. The non-transitory machine-readable medium of claim 17, wherein the simultaneously displaying includes displaying a first of the plurality of concurrently-active media streams at a first display size and at least one second of the plurality of concurrently-active media streams at a second display size, the first display size having larger pixel size than the second display size.

19. The -transitory machine-readable medium of claim 15, wherein the single connection is a single Transmission Control Protocol (TCP) connection between the computing device and the media source.

20. The non-transitory machine-readable medium of claim 9, wherein the sending the second plurality of requests comprises sending a plurality of pipelined HTTP requests for the plurality of concurrently-active media streams over a single Transmission Control Protocol (TCP) connection in an order based on the classification.

21. The non-transitory machine-readable medium of claim 15, wherein at least one of the sending the first plurality of requests and the sending the second plurality of requests comprises sending a plurality of HTTP range requests for ranges of media stream data files associated with the plurality of media streams over a single Transmission Control Protocol (TCP) connection.

22. The non-transitory machine-readable medium of claim 15, wherein at least one of the sending the first plurality of requests and sending the second plurality of requests utilizes a server-side protocol for multiplexing media streams over a single connection.

23. The non-transitory machine-readable medium of claim 22, wherein the server-side protocol is SPDY and the sending the second plurality of requests includes sending a corresponding request for each of the plurality of media streams including an SPDY stream creation control frame indicating an assigned priority for the respective media stream based on the classification.

24. A computing device, comprising:
   a display;
   a processor;
   a user interface;
   a storage component having program instructions, which when executed by the processor perform a method of requesting and receiving a media stream, the method including:

sending a first plurality of requests for a plurality of concurrently-active media streams;

receiving a control input to control a playback function of at least one of a plurality of media streams;

determining a download bandwidth between the computing device and a media source on a network;

classifying the plurality of concurrently-active media streams based on the control input and total download bandwidth; and sending a second plurality of requests for the plurality of concurrently-active media streams over a single connection to the media source, wherein the second plurality of requests represents an alteration of the first plurality of requests according to the classification.

25. The computing device of claim 24, wherein the classifying assigns a priority to each of the plurality of concurrently-active media streams and the sending the second plurality of requests comprises sending the second plurality of requests in an order based on the assigned priorities.

26. The computing device of claim 24, the method further comprising receiving over the single connection and simultaneously displaying, by the computing device, the plurality of concurrently-active media streams.

27. The computing device of claim 26, wherein the simultaneously displaying includes displaying a first of the plurality of concurrently-active media streams at a first display size and at least one second of the plurality of concurrently-active media streams at a second display size, the first display size having larger pixel size than the second display size.

28. The computing device of claim 24, wherein the single connection is a single Transmission Control Protocol (TCP) connection between the computing device and the media source.

29. The computing device of claim 15, wherein the sending the second plurality of requests comprises sending a plurality of pipelined HTTP requests for the plurality of concurrently-active media streams over a single Transmission Control Protocol (TCP) connection in an order based on the classification.

30. The computing device of claim 24, wherein at least one of the sending the first plurality of requests and the sending the second plurality of requests comprises sending a plurality of HTTP range requests for ranges of media stream data files associated with the plurality of media streams over a single Transmission Control Protocol (TCP) connection.

31. The computing device of claim 24, wherein at least one of the sending the first plurality of requests and the sending the second plurality of requests utilizes a server-side protocol for multiplexing media streams over a single connection.

32. The computing device of claim 31, wherein the server-side protocol is SPDY and the sending the second plurality of requests includes sending a corresponding request for each of the second plurality of media streams including an SPDY stream creation control frame indicating an assigned priority for the respective media stream based on the classification.

* * * * *